No. 641,680. Patented Jan. 23, 1900.
C. DILLING.
BABY CARRIAGE.
(Application filed Mar. 21, 1899.)
(No Model.) 2 Sheets—Sheet 1.
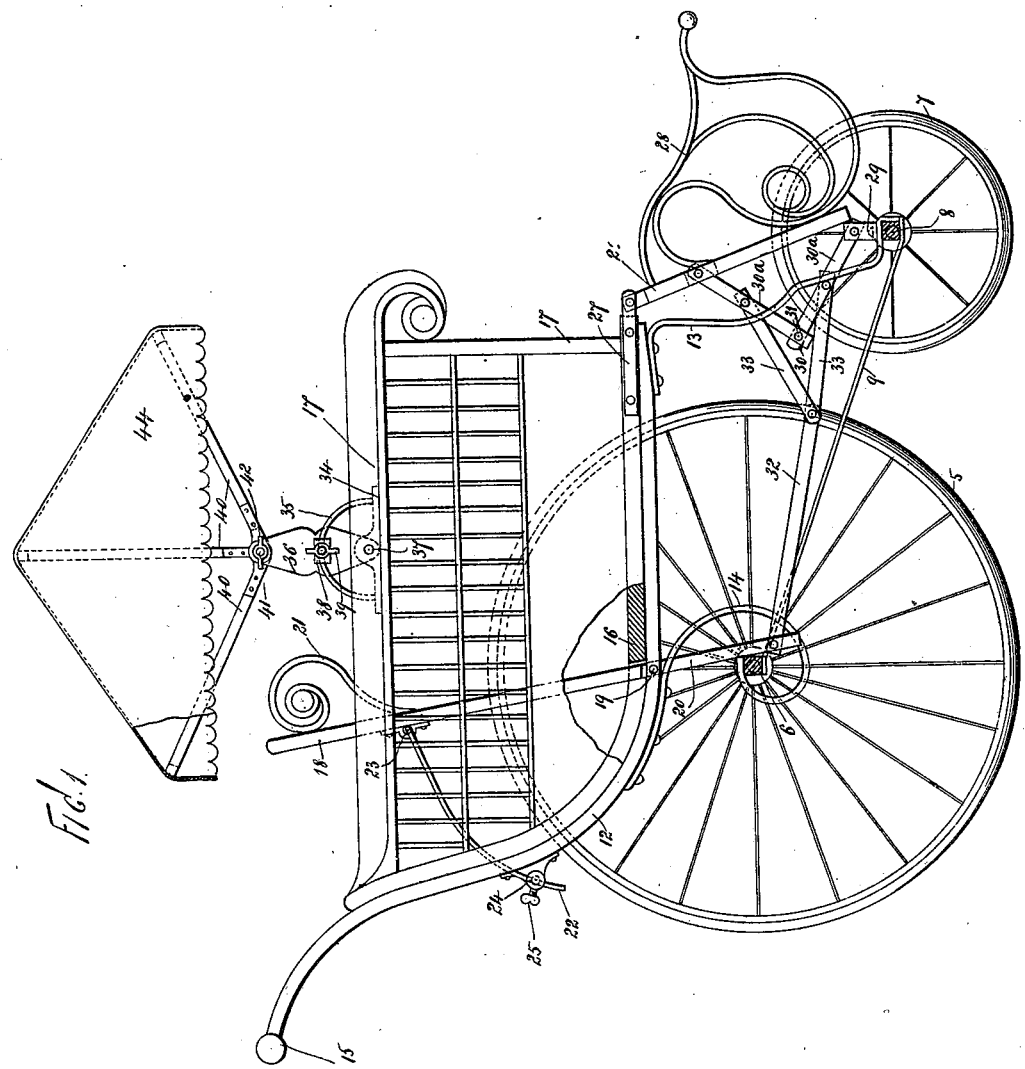
WITNESSES
INVENTOR
Charles Dilling
BY
Edgar Tate
ATTORNEYS No. 641,680. Patented Jan. 23, 1900.
C. DILLING.
BABY CARRIAGE.
(Application filed Mar. 21, 1899.)
(No Model.) 2 Sheets—Sheet 2.
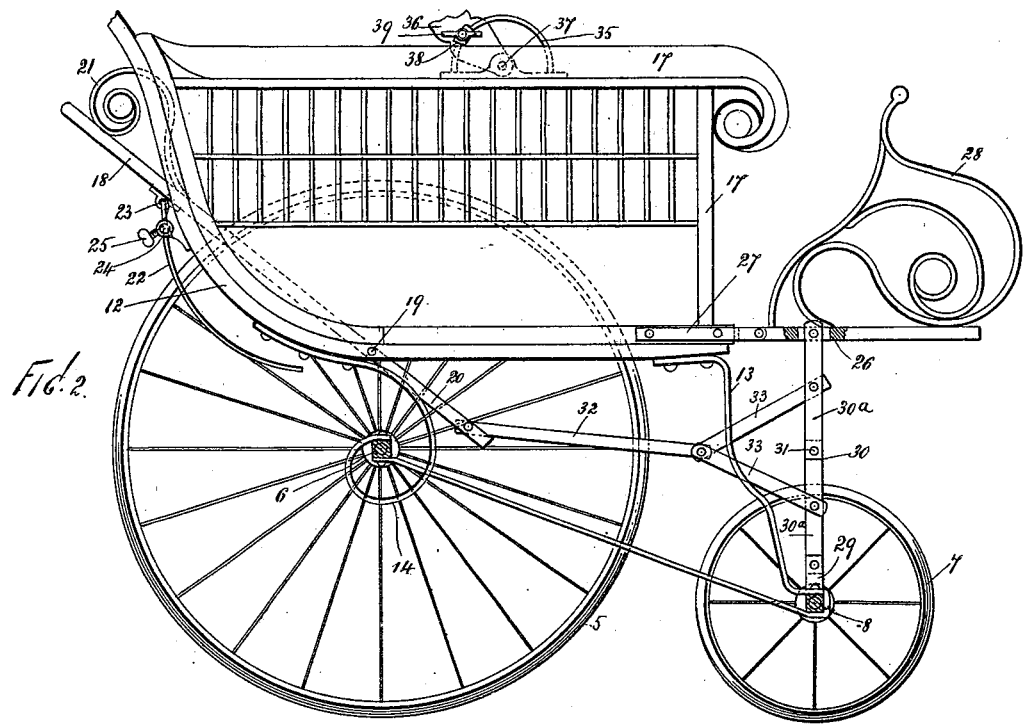
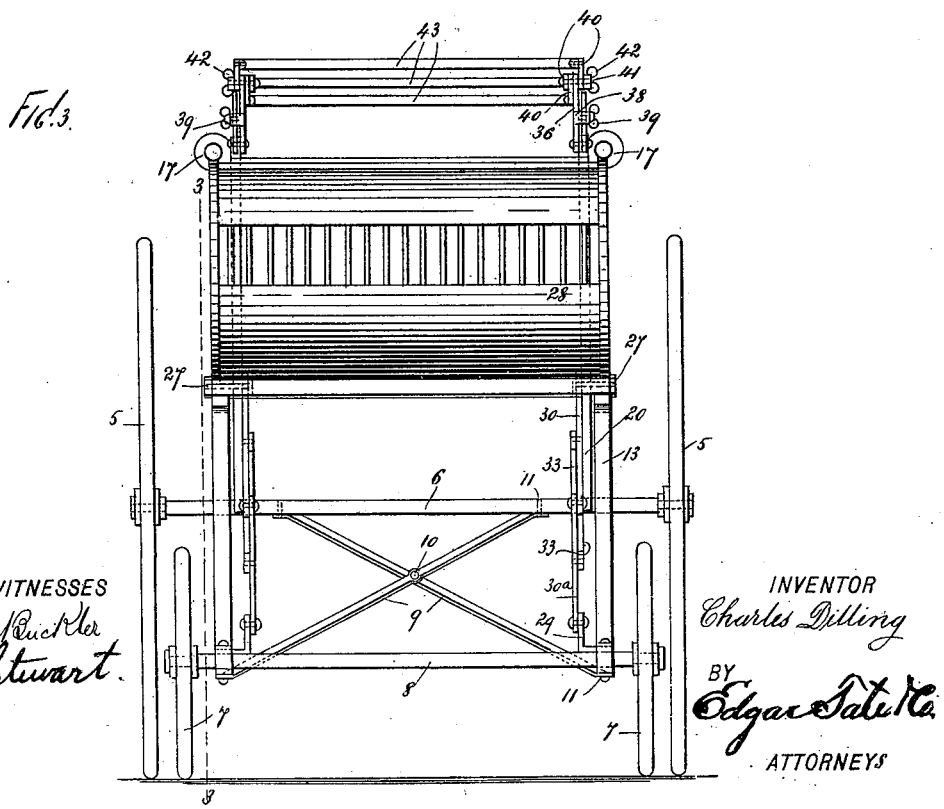
WITNESSES
John Buckler
T. A. Stewart
INVENTOR
Charles Dilling
BY
Edgar Tate & Co.
ATTORNEYS

UNITED STATES PATENT OFFICE.

CHARLES DILLING, OF NEW YORK, N. Y., ASSIGNOR OF ONE-HALF TO ADAM MANN, OF SAME PLACE.

BABY-CARRIAGE.

SPECIFICATION forming part of Letters Patent No. 641,680, dated January 23, 1900.

Application filed March 21, 1899. Serial No. 709,869. (No model.)

*To all whom it may concern:*

Be it known that I, CHARLES DILLING, a citizen of the United States, residing at New York, (Brooklyn,) in the county of Kings and State of New York, have invented certain new and useful Improvements in Baby-Carriages, of which the following is a full and complete specification, such as will enable those skilled in the art to which it appertains to make and use the same.

This invention relates to baby-carriages, and has more particular relation to a vehicle of this class so constructed and provided with such adjustments that it may be readily transformed into a go-cart.

The invention is fully disclosed in the following specification, of which the accompanying drawings form a part, in which like numerals of reference refer to like parts in the several views, and in which—

Figure 1 is a side elevation, partly cut away, of my improved carriage, being a section on the line 3 3 of Fig. 3; Fig. 2, a similar view with the parts in an altered position, and Fig. 3 a front end elevation thereof.

Referring more particularly to the drawings, the carriage is provided with a truck comprising large rear wheels 5, mounted upon a rear axle 6, and small front wheels 7, mounted upon a front axle 8. Two cross-braces 9, centrally joined, as at 10, are each secured at an end to the axle 6 and axle 8, as at 11, and provide the truck with sufficient rigidity.

The body portion is supported by the truck and consists of two rearwardly-extending and upwardly-curved side bars 12, each of which is supported at the forward end by a bent metal spring 13 and intermediately by a scroll-shaped spring 14, and the lower ends of the springs 13 and 14 are secured, respectively, to the axles 8 and 6. Each of the side bars 12 is projected at the rear end to form propelling-handles, as at 15. Mounted horizontally upon and extending between the forward portions of the side bars 12 is a bottom 16, (partially shown in Fig. 1,) and said bottom terminates in a line approximately above the rear axle 14. Side pieces 17 are mounted upon the side bars 12, and consist of an open-work frame or any suitable construction. A back 18 is pivoted between the side bars 12, as at 19, rearwardly of the bottom 16, and at each side is provided with an arm 20, which projects beneath the side bars 12. The top of the back 18 is provided with a suitable head-rest 21 of any desired form. The pivoted back 18 is provided at each side with a curved rod 22, pivoted thereto, as at 23, and passing through a keeper 24, secured to the rearward curve of the side bar 12. Each keeper is provided with a thumb-screw 25, by which the respective rod 22 and the back 18 may be locked in any of a plurality of adjusted positions.

The carriage-body is provided with a foot-rest 26, which is pivoted between the projecting ends of cleats or strips 27, secured to the forward ends of the side bars 12. An end board 28, which is formed, preferably, in the shape of a basket, is mounted upon the foot-rest 26. The foot-rest is normally supported in the same plane as the carriage-bottom 16, as shown in Fig. 2, by means of the following construction:

An angular metal piece 29 is bolted to the front axle 8 at each end thereof and just within each front wheel 7. A double-jointed lever 30, composed of two members 30ª, pivotally jointed at 31, is pivotally connected at its upper end to the foot-rest 26 at each side thereof and at its lower end to the angular piece 29. The pivotal connection of the upper end of the lever 31 with the foot-rest 26 is preferably rearward of the central portion of the latter. A connecting-rod is pivoted at its rear end to the lower end of each of the arms 20, and suitably pivoted to its forward end are a pair of links 33 and 33ª, each of which is pivoted at its forward end to the double-jointed lever 30, respectively above and below the pivotal joint 31 thereof.

Referring to Fig. 1, I provide a folded and adjustable sunshade, which is supported by each of the carriage-body side pieces 17, and the construction thereof is as follows: Upon each side piece 17 is supported a plate 34, in which is secured at each end an upwardly-arching segmental rod 35. A standard 36 is pivoted at its lower end to the plate 34, as at 37, and may be radially adjusted along the rod 35 by means of a keeper 38, through which said rod passes, and a thumb-screw 39, which is mounted in said keeper and operates in connection with said rod. A plurality of radial frame-arms 40 are pivoted to each of the standards 36 at their lower ends by means of a bolt 41, which passes through each of said frame-arms and through the standard 36 and which is provided with a thumb-screw 42. Cross-arms 43 connect the tops of the respective pairs of arms connected with both sides of the carriage-body, spanning the same, and a flexible cover 44 is suspended by the cross-arms 43 and falls about the arms 40, as shown in Fig. 1.

The operation of the adjustable parts of my baby-carriage will be evident from the foregoing description when taken in connection with the accompanying drawings and the following statement thereof.

The carriage is shown with the parts in normal relative position in Fig. 2, forming a baby-carriage of the usual construction and arrangement of members, and the back 18 is inclined but slightly from the horizontal, so that an infant may lie practically prone within the carriage and the feet be supported by the foot-rests in the same horizontal plane as the body. The standard 36 of the sunshade is also, as shown partially in Fig. 2, inclined rearwardly to bring the cover 44 over the eyes of the occupant. If now it be desired to convert the baby-carriage into a go-cart, the back 18 is pivotally raised until in approximately a vertical position, and when so adjusted the thumb-screws 25 are turned down to lock the rods 22 and the back 18. When the back 18 is raised, the arms 20, secured thereto beneath the side bars 12, draw rearwardly the connecting-rods 32, which in turn retract the links 33 and rearwardly flex the double-jointed lever 30 by means of its pivotal joint 31, and the foot-rest 26 is depressed pivotally until its forward end engages the angular pieces 29. The carriage-body seat 16, back 18, and foot-rest 26 and basket-shaped foot-board 28 now form a chair-like construction, in which the body of the occupant is supported with but slight rearward inclination. The legs may hang down over the foot-rest 26 and the feet rest against the basket-shaped foot-board 28. With the parts thus relatively adjusted the carriage may be used as a go-cart, and the standard 30 of the sunshade occupies a vertical position, so that the cover 44 may protect the erect head of the occupant of the carriage.

If desired, the sunshade-arms 40 may be bunched upon each side of the carriage and locked in this position by the thumb-screws 42, thus folding the sunshade, and the whole may be swung rearwardly or forwardly out of juxtaposition to the head of the occupant of the carriage.

It is evident that many changes may be made in the construction and operation of my baby-carriage without departing from the scope thereof and retaining the transformable features thereof, and I claim all such as come within the spirit of my invention.

Having fully described my invention, I claim as new and desire to secure by Letters Patent—

1. In a baby-carriage, provided with a truck, a carriage-body consisting of side bars, a bottom secured thereto, upwardly-directed side pieces secured to said side bars, a foot-rest pivotally connected with the forward end of said bottom, a back pivotally supported by and between said side bars, and rearward of said bottom, and provided with a downwardly-directed arm, and devices operatively connecting said arm and said foot-rest, and comprising a connecting-rod pivoted to said arm, and a double-jointed lever pivotally secured to said foot-rest at one end, and to said truck at the other end, and pivotally connected with said connecting-rod, substantially as shown and described.

2. In a baby-carriage provided with a truck, a carriage-body provided with a pivoted back, and a pivoted foot-rest, said back being provided with downwardly-directed arms beneath said carriage-body, a double-jointed lever secured at one end to said foot-rest at each side thereof, and at the other end to said truck, and composed of two members, a pair of links connected with each of said pairs of members and a connecting-rod pivoted to each of said arms, and with which each of said pairs of links is connected, substantially as shown and described.

3. In a baby-carriage, a carriage-body, and a sunshade comprising a foldable frame provided with a cover and supported by a standard pivotally supported at each side of said carriage-body, a segmental rod secured to said carriage-body in proximity to each of said standards, each of said standards being provided with a keeper and thumb-screw in connection with which the adjacent segmental rod operates, substantially as shown and described.

4. In a baby-carriage, a carriage-body, a sunshade, consisting of a standard adjustably mounted upon each side of said carriage-body, radial arms adjustably secured to each of said standards, devices for securing said radial arms in adjusted position, cross-arms supported transversely of said carriage-body by pairs of said radial arms, a flexible cover supported by said cross-arms, a segmental rod secured to said carriage-body in proximity to each of said standards, each of said standards being provided with a keeper and thumb-screw in connection with which the adjacent segmental rod operates, substantially as shown and described.

In testimony that I claim the foregoing as my invention I have signed my name, in presence of the subscribing witnesses, this 17th day of March, 1899.

CHARLES DILLING.

Witnesses:
F. A. STEWART,
V. M. VOSLER.